United States Patent
Suissa

(10) Patent No.: US 6,909,957 B2
(45) Date of Patent: Jun. 21, 2005

(54) METHOD FOR CONTROLLING YAW AND TRANSVERSAL DYNAMICS IN A ROAD VEHICLE

(75) Inventor: Avshalom Suissa, Althengstett (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/344,283

(22) PCT Filed: Aug. 15, 2001

(86) PCT No.: PCT/EP01/09411
§ 371 (c)(1),
(2), (4) Date: Feb. 10, 2003

(87) PCT Pub. No.: WO02/14137
PCT Pub. Date: Feb. 21, 2002

(65) Prior Publication Data
US 2004/0015284 A1 Jan. 22, 2004

(30) Foreign Application Priority Data
Aug. 16, 2000 (DE) .......................... 100 39 782

(51) Int. Cl.⁷ .............................................. B62D 7/15
(52) U.S. Cl. ............................ 701/82; 701/41; 701/48; 701/91; 180/443; 180/445; 180/446
(58) Field of Search ............................. 701/41, 48, 82, 701/91; 180/443, 445, 446

(56) References Cited

U.S. PATENT DOCUMENTS

| | | | | |
|---|---|---|---|---|
| 4,679,808 A | * | 7/1987 | Ito et al. ..................... | 180/408 |
| 4,767,588 A | | 8/1988 | Ito | |
| 5,208,751 A | * | 5/1993 | Berkefeld ..................... | 701/41 |
| 5,341,296 A | * | 8/1994 | Yasuno et al. ................ | 701/70 |
| 5,379,218 A | * | 1/1995 | Jacobi et al. ................. | 701/41 |
| 5,428,536 A | * | 6/1995 | Ackermann ................... | 701/42 |
| 5,455,770 A | * | 10/1995 | Hadeler et al. ............... | 701/70 |
| 5,762,157 A | * | 6/1998 | Uehara ....................... | 180/197 |
| 5,964,819 A | * | 10/1999 | Naito ........................ | 701/72 |

FOREIGN PATENT DOCUMENTS

| | | |
|---|---|---|
| DE | 3532222 | 3/1986 |
| DE | 3532247 | 3/1986 |
| DE | 4330055 | 3/1994 |

* cited by examiner

Primary Examiner—Michael J. Zanelli
Assistant Examiner—Eric M. Gibson
(74) Attorney, Agent, or Firm—Crowell & Moring LLP

(57) ABSTRACT

For the purpose of controlling the yaw dynamics and lateral dynamics in a road vehicle with electrically controlled four-wheel steering, in the case of which the setting of the front axle steer angle $\delta_v$ and of the rear axle steer angle $\delta_h$ is performed by means of mutually decoupled control loops, a desired value $\delta_{vsoll}$ for the lateral force $S_v$ to be built up at the front axle is determined in the control loop assigned to the front axle and, for this desired value $S_{vsoll}$, the value of the slip angle, linked to the desired value $S_{vsoll}$, is determined as desired value $\alpha_{vsoll}$ from an $S_v(\alpha_v)$ characteristic representing the dependence of the lateral force $S_v$, to be built up at the front axle, on the slip angle $\alpha_v$. In the control loop assigned to the rear axle, a desired value $S_{hsoll}$ for the lateral force $S_h$ to be built up at the rear axle is determined in a control process in accordance with a controller law of the form $$S_{hsoll} = \frac{l_v \cdot m \cdot v_x}{L} \cdot [\dot{\Psi} - \dot{\beta}_{hsoll} + k_1 \cdot (\beta_h - \beta_{-hsoll})]$$

and, for this desired value $S_{hsoll}$, the value of the slip angle, linked to the desired value $S_{hsoll}$, is determined as desired value $\alpha_{hsoll}$ from an $S_h(\alpha_h)$ characteristic. These desired values $\alpha_{vsoll}$ and $\alpha_{hsoll}$ are used to determine the desired values $\delta_{vsoll}$ and $\delta_{hsoll}$ of the steer angle, taking account of an estimated value of the sideslip angle $\beta$ at the center of gravity of the vehicle, the position of the center of gravity and measured or estimated values of the yaw velocity $\dot{\Psi}$ and of the longitudinal speed $v_x$ of the vehicle.

17 Claims, 2 Drawing Sheets

METHOD FOR CONTROLLING YAW AND TRANSVERSAL DYNAMICS IN A ROAD VEHICLE

BACKGROUND AND SUMMARY OF THE INVENTION

This application claims the priority of Application No. 100 397 82.4, filed Aug. 16, 2000, in Germany, the disclosure of which is expressly incorporated by reference herein.

The invention relates to a method and apparatus for controlling the yaw dynamics and lateral dynamics in a road vehicle having one steering device each for the front axle and for the rear axle, and having electrically drivable $\delta_v$ and $\delta_h$ steer-angle actuators. These actuators are assigned to the axles individually and can each be driven via a controller. These controllers generate from desired/actual value comparisons of variables which are characteristic of the yaw-dynamic and the lateral-dynamic behavior of the vehicle (e.g., the yaw velocity $\dot\Psi$ and a sideslip angle $\beta$) drive signals required for correcting the controlled variables, i.e., for the steer angle actuators. Control loops, provided for setting the steer angles $\delta_v$ and $\delta_h$, are decoupled from one another. The desired value prescription signals, required for the two control loops, for the control parameters are generated by means of a reference model, implemented by an electronic computer, from processing at least one output signal, representing the driver's wish, from a steering element position sensor and a sensor output signal characteristic of the operating state of the vehicle, for example a speed sensor.

In vehicles that are equipped with steer-angle actuators that can be driven independently of one another for front axle steering and rear axle steering, it is possible in principle to obtain "extreme" vehicle movements that cannot occur in the case of a normal vehicle which can be steered only via the front wheels. For example, a sideslip of the vehicle, that is to say a movement of the vehicle obliquely relative to the vehicle longitudinal axis, is possible without the vehicle yawing (e.g., by virtue of the fact that the front axle steering and the rear axle steering are set to the same steer angle with reference to the vehicle longitudinal axis). It is also possible to obtain a yawing, that is to say a rotary movement of the vehicle about its vertical axis, without the vehicle executing a slipping movement.

The use of such vehicle movements, which can be obtained only with two-axle steering, should be reserved for reasons of safety for such driving situations in which the driver consciously adopts such an unaccustomed vehicle behavior, for example, maneuvering in a very tight space. Such vehicle movements should not be used in the "normal" operation of the vehicle, corresponding to the statistically dominant driving situations, for which operation the driver "customarily" expects a reaction of the vehicle corresponding to the driver's wish.

It is, therefore, an object of the invention to specify a method of the type disclosed herein, which upon actuation of a steering element provided for setting a driver's wish, for example a steering wheel or joystick, leads to a vehicle reaction which is largely analogous to that of a vehicle which has only front axle steering, but yet permits improved utilization of the lateral guiding forces that can be built up by the two steer-angle actuators.

This object is achieved in the case of a method of the type disclosed herein by the overall combination of controlling the yaw dynamics and lateral dynamics in a road vehicle having one steering device each for the front axle and for the rear axle, and having electrically drivable $\delta_v$ and $\delta_h$ steer angle actuators, as regards the basic idea, with determining the desired value $S_{vsoll}$ of the lateral force to be built up at the front axle is determined in a control process in accordance with a controller law of the form $$S_{vsoll} = \frac{l_h \cdot m \cdot v_x}{L} \cdot [\dot\Psi - \dot\beta_{vsoll} + k_2 \cdot (\beta_v - \beta_{vsoll})]$$

or the desired value $S_{vsoll}$ of the lateral force to be built up at the front axle is determined in a control process in accordance with a controller law of the form $$S_{vsoll} = \frac{l_h \cdot m \cdot a_y}{L} + \frac{J_z}{L} \cdot [\dot\Psi_{soll} + k_3 \cdot (\dot\Psi - \dot\Psi_{soll})].$$

In this case, the type of determination of a desired value of the lateral force at the front wheels provided in accordance with the desired value $S_{vsoll}$ of the lateral force to be built up at the front axle corresponds to a sideslip angle control at the front axle in the way provided in general for determining the desired value of the lateral force at the rear axle, while the type of determination of a desired value of the lateral guiding force at the front axle corresponds to a control of yaw velocity via the steer angle control loop assigned to the front axle. The approximate determination of the method of determining the desired values of the slip angle of the front wheels and the rear wheels of the vehicle is sufficient in the majority of statistically significant driving situations to be able to carry out a determination of steer angle for the front and rear wheels of the vehicle that is adequate for the situation.

In the case of a control device for a road vehicle having one steering device each for the front axle and for the rear axle and having electrically drivable steer angle actuators, assigned to said axles individually, for two mutually decoupled control loops which are suitable for implementing the control of lateral force based on yaw computation, the method of a lateral acceleration sensor which directly detects the lateral acceleration active at the center of gravity of the vehicle is particularly expedient.

Taking account of the vehicle geometry, it is also possible for this device to provide two lateral acceleration sensors whose spacing from one another measured in the longitudinal direction of the vehicle may be as large as possible.

Both owing to an ability to switch over the control device to various defined control modes, and by means of a specific selection between different reference model variants of the vehicle which are provided for generating the prescribed desired values for the front axle and rear axle steer angles $\delta_v$ and $\delta_h$ and implemented by a computer, it is possible to set the vehicle to correspondingly different types of its response behavior to an actuation, acting as an expression of a specific driver's wish, of a steering element, i.e., the vehicle type (sports car or heavy limousine) can be selected, which corresponds to the desired driving behavior of the vehicle. The control modes described herein may also be used whenever the rear axle steering is implemented by virtue of the fact that the rear wheel brakes can be driven individually to develop defined braking forces, as a result of which they can specifically influence the yaw behavior of the vehicle via the rear wheels even without a steer-angle actuator for the rear axle.

The automatic switchover of the control device to a control mode with the yaw velocity as a controlled variable in which the vehicle is moving in the extreme range of lateral dynamics, i.e., the lateral forces may no longer be increased by enlarging slip angles, results in the fact that the vehicle still remains capable of being effectively controlled even an extreme range and/or in the event of failure of the rear axle steering, and a high measure of safety is achieved to this extent.

A significant improvement in the quality of control is achieved by means of disturbance estimators assigned to the controlled variables, preferably ones whose design model corresponds to that of the controller for the observed controlled variable, since, by contrast with a controller with an integral-action component, it is not the control error that is integrated, but the error between measurement and estimate, which can then be used to compensate disturbances.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
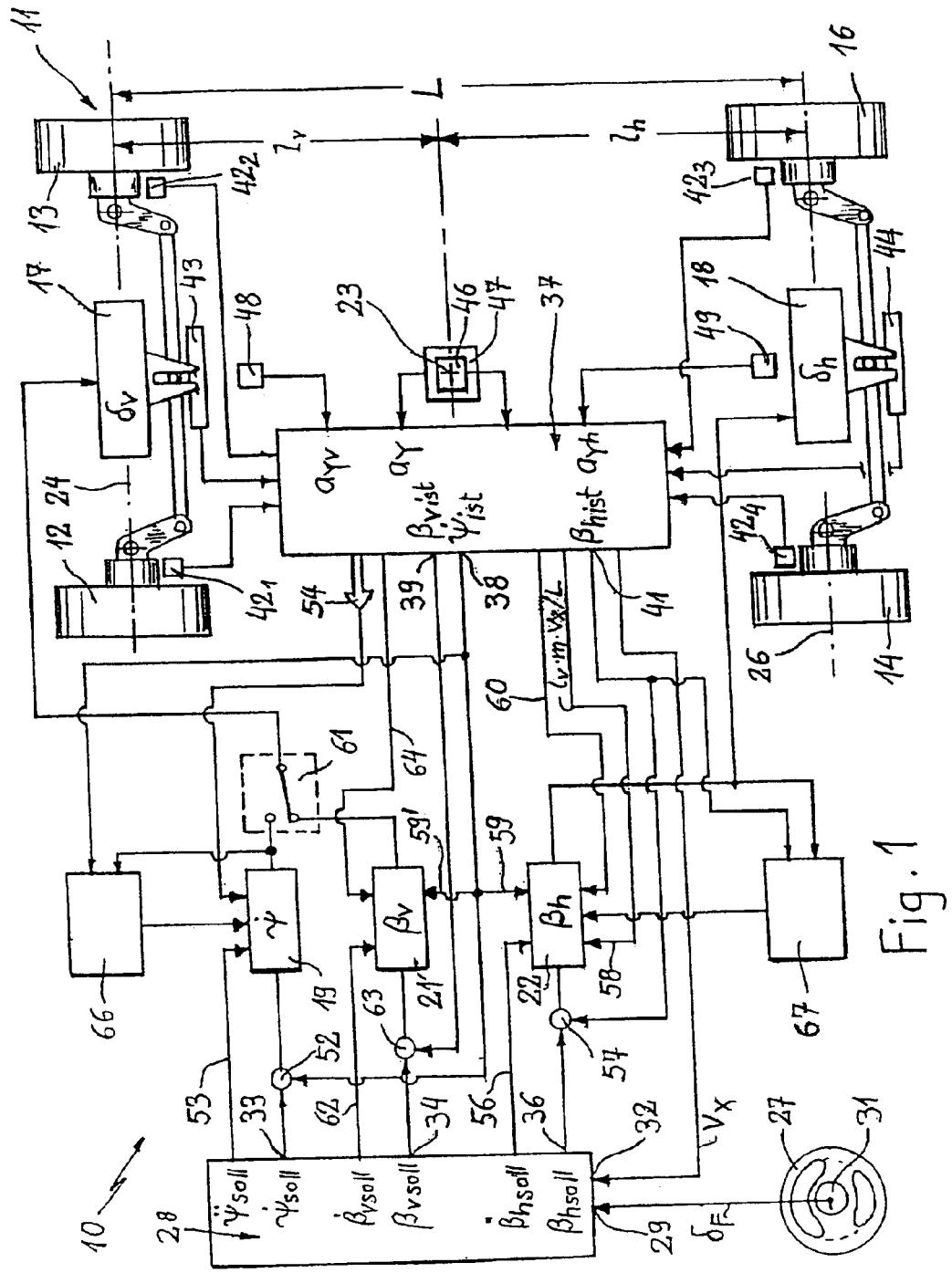
FIG. 1 shows a schematically simplified block diagram of a device according to an embodiment of the invention for the control of lateral dynamics on a road vehicle with front axle steering and rear axle steering.

A lateral dynamics control device 10, in FIG. 1, for a four-wheel drive road vehicle 11. Both the front wheels 12 and 13 and the rear wheels 14 and 16 of the vehicle 11 can be steered, and an electrically drivable steer angle actuator 17 or 18 may be provided for setting steer angles $\delta_v$ of the front wheels 12 and 13 and for setting steer angles $\delta_h$ of the rear wheels 14 and 16, respectively. The aim is to achieve a steering behavior which permits the vehicle to be guided by the driver in an effectively controllable fashion.

For the purpose of explanation, it may be assumed for the vehicle 11 that the front axle steer angle actuator 17 effects a "common" setting of the steer angles $\delta_{vl}$ and $\delta_{vr}$ for the two front wheels in the manner of trapeze steering. Additionally, the same also holds for the rear axle steer angle actuator 18. For the purpose of a simplifying "single-track" model of the vehicle, the front wheel steer angles $\delta_{vl}$ and $\delta_{vr}$ can be described by a single front axle steer angle $\delta_v$, and the rear wheel steer angles $\delta_{hl}$ and $\delta_{hr}$ can be described by a common "mean" rear axle angle $\delta_h$.

The steer angle actuators 17 and 18 can be implemented as electrohydraulic or as electromechanical actuators which can be driven by electric signals, which represent desired values $\delta_{vsoll}$ and $\delta_{hsoll}$ of the front axle steer angle $\delta_v$ and the rear axle steer angle $\delta_h$, seen in the single-track model of the vehicle 11, in order to set the relevant desired values.

These desired value signals for the front axle steer angle $\delta_v$ and the rear axle steer angle $\delta_h$ are generated by controllers 19, 21, and 22 which operate in control loops decoupled from one another, and generate drive signals characteristic of desired values for the steer angle actuators 17 and 18 from desired/actual value comparisons of variables characteristic of the lateral-dynamic behavior of the vehicle 11, specifically the yaw angular velocity $\dot{\Psi}$ at the center of gravity 23 of the vehicle 11, the sideslip angle $\beta_v$ in the region of the front axle 24 of the vehicle, and the sideslip angle $\beta_h$ in the region of the rear axle 26 of the vehicle 11.

In order to convert the driver's wish for a lateral-dynamic behavior he or she expects of the vehicle 11, and which the driver may indicate by actuating a steering element 27, e.g., a "conventional" steering wheel as illustrated or a joystick, provision is made of a reference model 28. This model may be implemented by an electronic computer to which there is fed at a first input 29, the "driver's wish input," an electric output signal, characteristic of a steer angle $\delta_F$, of a steering element position sensor 31 which corresponds to a steering behavior of the vehicle 11 desired by the driver. At a second input 32, a "speed input," the reference model 28 may be fed an electric state signal which is a measure of the longitudinal speed $v_x$ of the real vehicle.

The reference model 28 outputs at a first output 33 an electric output signal which is a measure of a desired value $\dot{\Psi}_{soll}$ of the yaw angular velocity of the real vehicle about its vertical axis passing through the center of gravity 23.

At a second output 34, the reference model 28 outputs an electric output signal which, in the event of cornering, is a measure of the desired value $\beta_{vsoll}$ of the sideslip angle of the vehicle in the region of its front axle 24. At a third output 36, it outputs an electric output signal which is a measure of the desired value $\beta_{hsoll}$ of the sideslip angle of the real vehicle 11 at the rear axle 26 of the vehicle.

The generation of these desired values, whose input determines the reaction behavior of the vehicle to an actuation of the steering wheel 27—setting of the steer angle $\delta_F$—is expediently done so as to produce a lateral-dynamic behavior of the vehicle 11 that is "understandable," i.e., effectively manageable, to the driver. The reference model 28 may be designed so as to produce a "neutral" cornering behavior to which identical slip angles $\alpha_v$ and $\alpha_h$ at the front axle 24 and the rear axle 26 correspond; however, it is also possible for the reference model 28 to be designed so as to produce a cornering behavior of the vehicle which is easy to oversteer and approximates that of a sports vehicle, or else to achieve an oversteering behavior such as may be characteristic of front-wheel-drive vehicles.

Actual value signals suitable for comparison with the $\dot{\Psi}_{soll}$, $\beta_{vsoll}$, and $\beta_{hsoll}$ value signals are generated by a vehicle model 37, which is also implemented by an electronic computer and outputs at a first output 38, from processing-measured, operationally characteristic variables and vehicle-specific data, an electric output signal which is a measure of the actual value $\dot{\Psi}_{ist}$ of the yaw angular velocity of the vehicle 11 about its vertical axis. The vehicle model 37 also outputs at a second output 39 an electric output signal which is a measure of the actual value $\beta_{vist}$ of the sideslip angle of the front axle 24, and further outputs at a third output 41 an electric output signal which is a measure of the actual value $\beta_{hist}$ of the sideslip angle $\beta_h$ at the rear axle 26 of the real vehicle 11.

Variable data suitable for generating the actual value output signals of the vehicle model 37, i.e., ones which must be detected continuously during driving operation, and "vehicle-specific data," i.e., ones which are permanently prescribed by the vehicle or can be detected by a single measurement and can then be regarded as constant at least for a relatively long time interval, are as follows in the case of a selected exemplary embodiment: the output signals of wheel speed sensors $42_1$ to $42_4$ individually assigned to the vehicle wheels 12, 13, 14, and 16, which permit accurate determination of the longitudinal speed $v_x$ of the vehicle; the output signals of an electronic or electromechanical front axle steer angle position sensor 43 assigned to the front axle steer angle actuator 17, and of a steering element position sensor 44 assigned to the rear axle steer angle actuator 18; the output signal of a yaw velocity ($\dot{\Psi}$) sensor 46 as a measure of the yaw velocity $\dot{\Psi}$ about the vertical axis of the vehicle passing through the center of gravity 23 of the same, the output signal of a lateral acceleration ($a_y$) sensor 47 as a measure of the lateral acceleration $a_y$ acting at the center of gravity 23 of the vehicle 11 perpendicular to the vehicle longitudinal direction, the x-direction; and if appropriate, the output signal of a lateral acceleration sensor 48, expediently arranged in the vicinity of the front axle 24, and/or the output signal of a lateral acceleration ($a_{yh}$) sensor 49 arranged more in the vicinity of the rear axle 26 as a measure of a lateral acceleration acting in the lateral direction on the vehicle at a distance from its center of gravity 23.

Stored in the vehicle model 37 as "vehicle-specific" data which are suitable in conjunction with the above-named variable data for determining the actual values $\dot{\Psi}_{ist}$, $\beta_{vist}$ and $\beta_{hist}$ are the wheelbase L of the vehicle and, if appropriate, the wheel track of the front and rear axles as fixed value(s). Further, variables subjected at most to slight variations, which can be corrected if required by intermittent measurement or estimation, are the vehicle mass m, the distance $l_v$ of the center of gravity 23 from the front axle 24, or $l_h$ of the center of gravity 23 from the rear axle 26, the yaw moment of inertia $J_I$ of the vehicle 11 about its vertical axis, and tire characteristics. These variables may reproduce the relationship between the lateral forces $S_v$ and $S_h$, which can be built up by steering actuation at the front axle and the rear axle, as a function of the respective slip angles $\alpha_v$ and $\alpha_h$.

In order to explain the processing of these variables by the model computer 37, reference is made below to a simplified linearized single-track model of a road vehicle, in which the steer angles $\delta_v$ and $\delta_h$ at the front axle 24 and the rear axle 26, respectively, are given by the following relationships:

$$\delta_v = -\beta + \frac{l_v \cdot \dot{\Psi}}{v_x} + a_v \quad (1)$$

and $$\delta_h = -\beta - \frac{l_h \cdot \dot{\Psi}}{v_x} + a_h. \quad (2)$$

In the linearized single-track model, i.e., one regarded for small values of the steer angles $\delta_v$ and $\delta_h$ or around 10°, selected for the purpose of explanation, the sideslip angle $\beta$ at the center of gravity of the vehicle 11 is given to a good approximation by the relationship $$\beta = -\frac{v_y}{v_x} \quad (3)$$

in which $v_y$ denotes the velocity component of the vehicle produced during cornering perpendicular to the longitudinal velocity component $v_x$ of the vehicle velocity $v_F$ which is determined by the vector sum of these two velocity components.

The lateral velocity component $v_y$ may be "measured," or at least approximately determined, from an integration of the lateral acceleration $a_y$ acting at the center of gravity of the vehicle, and/or be estimated from the wheel speeds, the set steer angles $\delta_v$ and $\delta_h$, and the geometrical dimensions of the vehicle.

Furthermore, the sideslip angles $\beta_v$ and $\beta_h$ at the front axle or the rear axle, respectively, are linked to the sideslip angle $\beta$ at the center of gravity of the vehicle by the relationships $$\beta_v = \beta - \frac{J_z \cdot \dot{\Psi}}{l_h \cdot m \cdot v_x} \quad (4)$$

and $$\beta_h = \beta + \frac{J_z \cdot \dot{\Psi}}{l_v \cdot m \cdot v_x}. \quad (5)$$

The controller 19 provided for driving the front axle steer angle actuator 17 is designed as a yaw velocity controller which uses a controller law in the form of $$S_{vsoll} = \frac{l_h \cdot m \cdot a_y}{L} + \frac{J_z}{L} \cdot [\dot{\Psi}_{soll} - k \cdot (\dot{\Psi} - \dot{\Psi}_{soll})] \quad (6)$$

to determine a desired value $S_{vsoll}$ of the lateral force which is a function $S(\alpha_v)$ of the slip angle $\alpha_v$ at the front axle.

Corresponding to this desired value $S_{vsoll}$, which is determined by the yaw velocity control and by the relationship $$S_{vsoll} = \frac{l_h \cdot m \cdot a_y}{L} + \frac{J_1 \cdot \dot{\Psi}_{soll}}{L} \quad (6')$$

in the event of a vanishing system deviation e (where $e = \dot{\Psi} - \dot{\Psi}_{soll} = 0$), is the requirement, holding for stable cornering of the vehicle and expressed in general by the relationship $$J_1 \cdot \dot{\Psi} = S_v \cdot 1_v - 1_h \cdot S_h \quad (7)$$

for balancing the moments about the vertical axis of the vehicle 11 when the lateral force $S_h$ occurring at the rear axle 26 of the vehicle 11 is eliminated in this relationship (7) in accordance with the relationship $$m \cdot a_y = S_v + S_h \quad (8).$$

Figure 2:
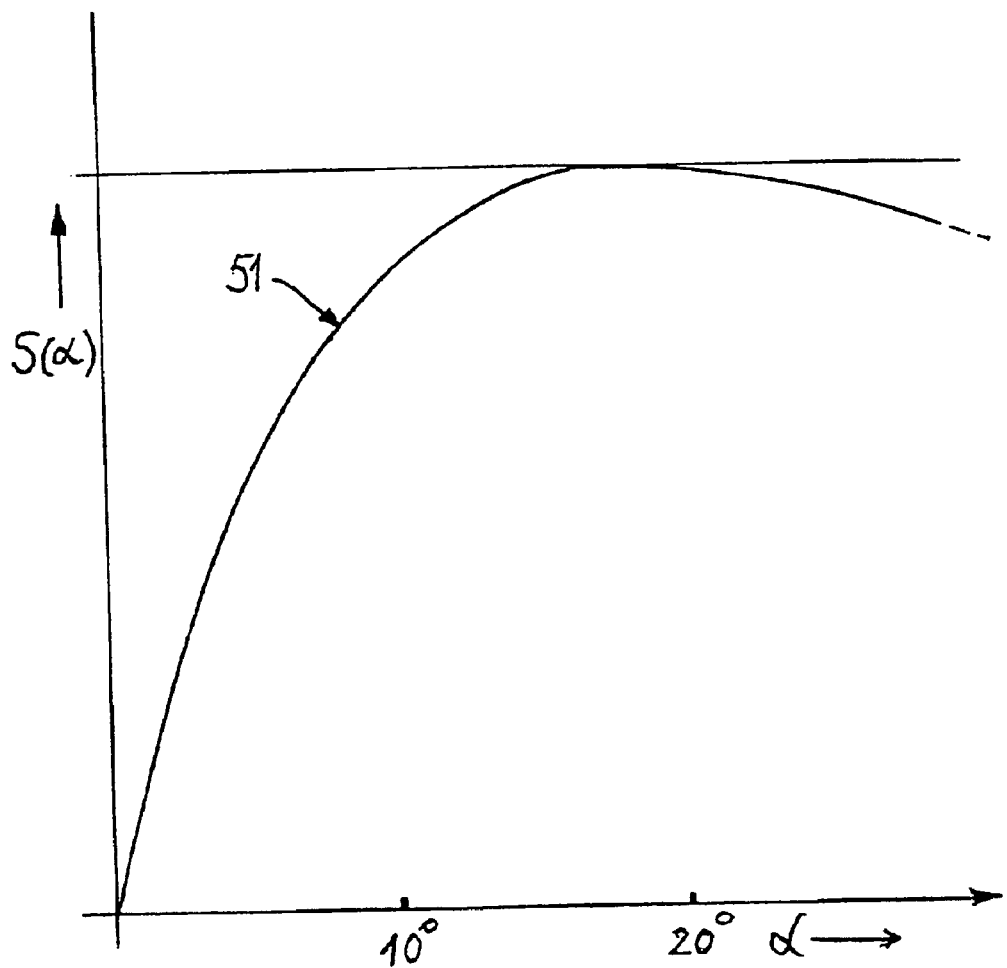
FIG. 2 shows a lateral force/slip angle diagram for illustration of the functioning of the control device in accordance with FIG. 1.

Because of the dependence, illustrated qualitatively in FIG. 2, of the lateral forces, which can be determined, mathematically as it were, in accordance with the relationship (6'), on the slip angles $\alpha$ to be set by the steering actuation, in accordance with the relationship $$\delta_{vsoll} = -\beta + \frac{l_v \cdot \dot{\Psi}}{v_x} + a_{vsoll} \quad (1')$$

there is linked to each by the $\dot{\Psi}$ control in accordance with the relationships (6) and (6'), respectively, a desired value $\alpha_{vsoll}$ of the slip angle which is to be used in accordance with the relationship (1) in the determination of the desired value $\delta_{vsoll}$ for the manipulated variable $\delta_v$ and desired value $\alpha_{vsoll}$ of the slip angle $\alpha_v$. The dependence of the lateral force S on the slip angle $\alpha$ is either stored in tabular form in the $\dot{\Psi}$ controller 19, which is implemented for its part as a computer and determines the desired value $\delta_{vsoll}$ for the front axle steer angle $\delta$ in accordance with the relationship (1'), or implemented by a control algorithm which can be evaluated by the computer. In the case of the exemplary embodiment selected for explanation, the desired value $\alpha_{vsoll}$ of the slip angle is determined for the purpose of a linear approximation in accordance with a relationship of the form $$a_{vsoll} = \frac{S_{vsoll}}{C_v}, \quad (9)$$

in which $C_v$ denotes a slip stiffness characteristic of the tire. Values of this slip stiffness can be taken from manufacturers' data or estimated or determined by suitable experiments and/or adaptive measurement methods. The approximation in accordance with the relationship (9) constitutes a sufficiently accurate approximation, at least for small slip angles (up to 10°) as may be gathered directly from the S(α) characteristic curve 51 of the diagram shown in FIG. 2.

The $\Psi_{soll}$ value required for the evaluation of the relationship (6) or (6') by the $\dot\Psi$ controller 19 is generated by the reference model 12—by differentiating the $\Psi_{soll}$ output signal with respect to time—and is fed directly to the controller 19, as illustrated schematically by a $105_{soll}$ signal path 53.

The system deviation e is determined at the $\dot\Psi$ reference point 52 as the difference between the $\dot\Psi_{ist}$ value signal output by the real vehicle model 37 and the $\dot\Psi_{soll}$ value signal output by the reference model 28, and processed in the controller in accordance with the relationship (6) with the aid of a controller gain k, freely selectable in principle, of the $\dot\Psi$ controller 19.

The inputs, further required by the $\dot\Psi$ controller, of the variables $l_h \cdot m \cdot a_y/L$, the ratio $J_2/L$, the sideslip angle β at the center of gravity of the vehicle, and the variable $l_v \cdot \dot\Psi/v_x$ are generated by the real vehicle model 37 and fed "directly" to the controller 19. The signal paths required for this purpose are represented only by a single signal path arrow 54 in FIG. 1, for the sake of simplicity.

The controller 22 provided for driving the rear axle steer angle actuator 18 is designed as a sideslip angle ($β_h$) controller, which uses a controller law of the form $$S_{hsoll} = \frac{l_v \cdot m \cdot v_x}{L} \cdot \left[ \Psi - \dot\beta_{hsoll} + k_1 (\beta_{hist} - \beta_{hsoll}) \right] \quad (10)$$

to determine a desired value for the lateral force $S(α_h)$ to be built up at the rear axle 26 of the vehicle 11 by actuating the steering. This desired value that may be determined by the $β_h$ control is given in the case of a vanishing system deviation ($β_{hist}-β_{hsoll}=0$) by the relationship $$S_{hsoll} = \frac{l_v \cdot m \cdot v_x}{L} \cdot \left[ \Psi - \dot\beta_{hsoll} \right]. \quad (10')$$

The starting point for designing the controller is the plausible assumption that the temporal change $\dot\beta_h$ in the sideslip angle at the rear axle 26 of the vehicle 11 is proportional to the difference between the sideslip angle actual value $β_{hist}$ and the desired value $β_{hsoll}$.

By being differentiated with respect to time, the relationship (5) for the sideslip angle $β_h$ at the rear axle of the vehicle yields the relationship $$\dot\beta_h = \dot\beta + \frac{J_z \cdot \dot\Psi}{l_v \cdot m \cdot v_x} \quad (5')$$

which, taking account of the relationship (3), assumes the following form on the assumption that the longitudinal speed component $v_x$ of the vehicle can be regarded as constant:

$$\dot\beta_h = -\frac{\dot v_y}{v_x} + \frac{J_z \cdot \dot\Psi}{l_v \cdot m \cdot v_x} \quad (5'')$$

It follows directly from the requirement for balancing the lateral forces at the vehicle during cornering, written in the form $$mv_y = S_v + S_h - m \cdot v_x \cdot \dot\Psi \quad (11)$$

that $$\dot v_y = \frac{S_v + S_h}{m} - v_x \cdot \dot\Psi. \quad (11')$$

Substituting the relationship (11') in the relationship (5") yields the relationship $$\dot\beta_h = -\frac{S_v + S_h}{m \cdot v_x} + \dot\Psi + \frac{J_z \cdot \dot\Psi}{l_v \cdot m \cdot v_x}. \quad (12)$$

If the front axle lateral force $S_v$ is eliminated from this relationship (12) with the aid of the relationship (7) expressing the requirement for balancing the moments in the case of the vehicle, the following relationship is yielded for the temporal change $\dot\beta_h$ in the sideslip angle at the rear axle 26

$$\dot\beta_h = \dot\Psi - \frac{S_h \cdot l_v}{m \cdot v_x \cdot l_v} - \frac{l_h \cdot S_h}{l_v \cdot m \cdot v_x} = \dot\Psi - \frac{L \cdot S_h}{m \cdot v_x \cdot l_v} \quad (13)$$

from which the following relationship follows directly for the lateral force $S_h(α_h)$ at the rear axle $$S_h(α) = \frac{l_v \cdot m \cdot v_x}{L} \cdot (\dot\Psi - \dot\beta_h) \quad (10'')$$

which with the desired value $\dot\beta_{hsoll}$ output for the sideslip angle control at the rear axle of the reference model corresponds to the relationship (10').

The $\dot\beta_{hsoll}$ input required by the $\dot\beta_h$ controller 22 for evaluating the relationship (10) or the relationship (10') is generated by the reference model 28 and fed "directly" to the controller 22, as illustrated schematically by the $β_{hsoll}$ signal path 56.

The system deviation $e_h$ (where $e_h=β_{hist}-β_{hsoll}$) processed "multiplicatively" by the $β_h$ controller 22 with the aid of the controller gain $k_1$, which is freely selectable in principle, is determined at the $β_h$ reference point 57.

The inputs, further required by the $β_h$ controller 22, for the variable $l_v \cdot m \cdot v_x/L$ and for the actual value $\dot\Psi_{ist}$ of the yaw angular velocity are generated by the real vehicle model 37 and fed "directly" to the $β_h$ controller 22, as illustrated by the relevant signal paths 58 and 59.

The determination of the desired value $α_{hsoll}$, of the slip angle $a_h$ at the rear axle 26 from the desired value $S_{hsoll}$, obtained by the sideslip angle control at the rear axle, of the lateral force at the rear axle 26 is performed in a way similar to that with reference to the $\dot\Psi$ controller 19.

The determination of the desired value $δ_{hsoll}$ for the rear axle steer angle to be set, i.e., the formation of the actuating signal for this angle, is performed in accordance with the relationship $$δ_{hsoll} = β - \frac{l_h \cdot \dot\Psi}{v_x} + α_{hsoll}. \quad (2')$$

The inputs, still additionally required for this purpose, for the sideslip angle β at the center of gravity 23 of the vehicle as well as for the variable $l_h \cdot \dot\Psi_{ist}/v_x$, may be generated by the real vehicle model 37 and fed to the controller 22 via signal paths which are represented only by a single signal arrow 60, for the sake of simplicity of illustration.

It is clear from the outlined type of the $\dot{\Psi}$ control and the $\beta_h$ control that the two control loops are decoupled "physically," and this particularly benefits the robustness of the control.

In the case of the lateral dynamics control device 10, there is also provided as an alternative to driving the front axle steer angle actuator 17 with the aid of $\delta_{vsoll}$ output signals of the $\dot{\Psi}$ controller 19 a drive of the front axle steer angle actuator 17 with the aid of $\delta_{vsoll}$ output signals of the further controller 21, as illustrated diagrammatically by a selector switch 61.

In functional analogy with the $\beta_h$ controller 22 provided for driving the rear axle steer angle actuator 18, this further controller 21 is designed as a sideslip angle ($\beta_v$) controller which, in accordance with a controller law of the form $$S_{vsoll} = \frac{l_h \cdot m \cdot v_x}{L} \cdot [\dot{\Psi} \cdot \beta_{vsoll} + k_2 \cdot (\beta_v - \beta_{vsoll})] \quad (14)$$

determines desired values for the lateral force $S(\alpha_v)$ to be built up at the front axle 24 of the vehicle 11 by actuating the steering.

The $\dot{\beta}_{vsoll}$ input required by the $B_v$ controller 21 is generated by the reference model 28 and fed "directly" to the $\beta_v$ controller 21, as illustrated diagrammatically by the $\dot{\beta}_{vsoll}$ signal path 62. The system deviation $e_v$ (where $e_v = \beta_{vist} - \beta_{vsoll}$) processed by the $\beta_v$ controller 21 with the aid of the once again freely selectable controller gain $k_2$ is determined at the $\beta_v$ reference point 63.

The inputs, further required by the $\beta_v$ controller 21, for the variable $l_h \cdot m \cdot v_x/L$ and for the actual value $\dot{\Psi}_{ist}$ of the yaw angular velocity are generated by the real vehicle model 37 and fed "directly" to the $\beta_v$ controller, as illustrated by the relevant signal paths 64 and 59'.

The determination of desired values $\alpha_{vsoll}$ of the slip angle $\alpha_v$ at the front axle 24 from the desired value $S_{vsoll}$ of the lateral force obtained by the sideslip angle control at the front axle is performed as explained with the aid of the description of the controller 19. Similarly, the determination of the desired value $\delta_{vsoll}$ for the front axle steer angle $\delta_v$ to be set is also described.

The $\dot{\Psi}$ controller 19 and the $\beta_v$ controller 21 are designed such that the reaction behavior of the vehicle 11 in an operating mode of the lateral dynamics control device 10 in which the setting of the front axle steer angle $\delta_v$ is performed by means of the $\dot{\Psi}$ controller 19 differs significantly from that reaction behavior of the vehicle when the control device 10 operates in an operating mode in which the setting of the front axle steer angle $\delta_v$ is performed by means of the $\beta_v$ controller 21. The vehicle 11 may, therefore, be set as a result of two desired modes of reaction by switching over the selector switch 61, for example to "sports," i.e., moderately oversteering, and to neutral cornering behavior.

Further modes of reaction—"vehicle types"—can be realized by virtue of the fact that the reference model 28 can be set selectively to various defined types of generation of its desired value output signals.

In order to improve the quality of the control, provision is made of disturbance estimators which are individually assigned to the controlled variables and whose purpose is to detect disturbances such as side wind, roadway slope, and/or different adhesion coefficients at the two sides of the vehicle ($\mu$-split ratios), and to take these into account during control for the purpose of disturbance compensation. Moreover, the disturbance estimators are also intended to compensate model errors resulting from the fact that the vehicle model can take account of reality only approximately. In accordance with the outlined decoupling of the control loops assigned to the front wheels 12 and 13, on the one hand, and to the rear wheels 14 and 16, on the other hand, for the sake of simplifying the illustration, only one disturbance estimator 66 for the front axle control loop and one disturbance estimator 67 for the $\beta_h$ control loop are illustrated. The disturbance estimators 66 and 67 are designed, in general, as models of the controlled system which are implemented by electronic computers. The disturbance estimators receive the same inputs, specifically, the desired value output signals of the assigned controllers 19 and 22, as the assigned controlled systems, and generate therefrom outputs corresponding to the controlled variables $\dot{\Psi}$ and $\beta_h$, and also generate from the comparison of their relevant outputs with the corresponding outputs of the vehicle model 37 of the real vehicle estimated values $\hat{\Delta}_{v,h}$ for the respective disturbance, their feedback to the controller 19 or 22 rendering it possible for the system deviation to be caused to vanish.

A suitable design of such a disturbance estimator which can be extended to the further control loops may be explained in more detail on the example of the $\beta_h$ control loop:

The starting point for designing the estimator 67 is the relationship $$\dot{\beta}_h = \dot{\Psi} - \frac{L \cdot c_h \cdot \alpha_h}{m \cdot v_x \cdot l_v} + \Delta_h \quad (13')$$

for the temporal change in the controlled variable $\beta_h$, which results when the lateral force $S_h$ in accordance with the relationship (9) is replaced in the relationship (13), which also corresponds to the design model of the controller 22, by the relationship $$S_h = c_h \cdot \alpha_h \quad (9)$$

where $\Delta_h$ is used to denote a deviation from the model relationship (13) which is determined, inter alia, by the linearization of the lateral force $S_h$.

It is assumed for this disturbance $\Delta_h$ with reference to the estimator model that it is quasi-constant in time, that is to say that it holds that:

$$\dot{\Delta}_h = o. \quad (13'')$$

Starting from this model, the disturbance estimator 67 is designed in accordance with the relationships $$\dot{\hat{\beta}}_h = \hat{\Delta}_h + \dot{\Psi} - \frac{L \cdot c_h \cdot \alpha_h}{m \cdot v_x \cdot l_v} + k \cdot (\beta_{hist} - \hat{\beta}_h) \text{ and} \quad (14)$$

$$\dot{\hat{\Delta}}_h = k' \cdot (\beta_{hist} - \hat{\beta}_h). \quad (15)$$

Here, in the relationship (14) k denotes a gain with which the difference $\beta_{hist} - \hat{\beta}_h$ is fed back into the estimator model represented by the relationship (13'), and k' denotes the gain with which the difference is fed back to the model of disturbance represented by the relationship (13").

The gains k and k' can be determined by pole prescription using the known root locus method. The actual value $\beta_{hist}$ is available as output of the real vehicle.

Numerical integration of the relationships (14) and (15) using known methods, for example the Euler method or the Runge-Kutta method, yields the sought disturbance $\hat{\Delta}_h$, which is taken into account for the purpose of balancing disturbances when forming the desired value of the rear axle steer angle $\delta_{hsoll}$ in accordance with the relationship $$\delta_{hsoll} = -\beta - \frac{l_h \cdot \Psi}{v_x} + \alpha_{hsoll} - \hat{\Delta}_h \cdot \frac{m \cdot l_v \cdot v_x}{L \cdot c_h}. \quad (16)$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling yaw dynamics and lateral dynamics in a road vehicle having a first axle and a second axle comprising;

determining a desired steer angle;

calculating a desired front axle value signal for input to a first controller;

calculating a desired rear axle value signal for input to a second controller;

generating a first drive signal via said first controller for driving an electrically drivable front steer-angle actuator;

generating a second drive signal via said second controller for driving an electrically drivable rear steer-angle actuator;

determining a desired value $S_{vsoll}$ for a lateral force $S_v$ to be built up at said front axle in a control process in a control loop assigned to said front axle;

determining for said desired value $S_{vsoll}$ a desired value $\delta_{vsoll}$ of a front axle steering angle by a relationship of a form $$\delta_{vsoll} = -\beta + \frac{l_v \cdot \Psi}{v_x} + \alpha_{vsoll},$$

wherein $l_v$ being a distance from a center of gravity of said vehicle to said front axle, $\beta$ being a sideslip angle, $\dot{\Psi}$ being a yaw velocity, $\alpha_{vsoll}$ being a desired value of a slip angle at said front axle, and $V_x$ being a longitudinal speed of said road vehicle;

determining a desired value $S_{hsoll}$ for a lateral force $S_h$ to be built up at said rear axle in a control process by a relationship of a form $$S_{hsoll} = \frac{l_v \cdot m \cdot v_x}{L} \cdot [\Psi - \dot{\beta}_{hsoll} + k_1 \cdot (\beta_h - \beta - _{hsoll})]$$

in a control loop assigned to said rear axle, wherein m being a mass of said vehicle, L being a wheelbase of said vehicle, $\beta_{hsoll}$ being a desired slideslip angle of said vehicle in a region of said rear axle, and $\beta_h$ being a slideslip angle of said vehicle in said region of said rear axle, and $\beta_h$ being a first controller gain; and determining for said desired value $S_{hsoll}$ a value of a rear axle steering angle $\delta_{hsoll}$ by a relationship of a form $$\delta_{hsoll} = -\beta - \frac{l_h \cdot \Psi}{v_x} + \alpha_{hsoll}.$$

2. The method of claim 1, wherein said desired value $S_{vsoll}$ of said lateral force to be built up at said front axle being determined in a control process by a relationship of a form $$S_{vsoll} = \frac{l_h \cdot m \cdot v_x}{L} \cdot [\Psi - \dot{\beta}_{vsoll} + k_2 \cdot (\beta_v - \beta_{vsoll})],$$

wherein m being a mass of said vehicle, $l_h$ being a distance from a center of gravity of said vehicle to said rear axle, $\beta_{vsoll}$ being a desired slideslip angle of said vehicle in a region of said front axle, $\beta_v$ being a slideslip angle of said vehicle in said region of said front axle, and $k_2$ being a second controller gain.

3. The method of claim 2, wherein said desired value $\alpha_{vsoll}$ of said slip angle $\alpha_v$ at said front axle being obtained from a linear relationship of a form $$\delta_{vsoll} = \frac{S_{vsoll}}{C_v},$$

and wherein $C_v$ being an estimated front wheel slip stiffness.

4. The method of claim 2, wherein said desired value $\alpha_{hsoll}$ of said slip angle $\alpha_h$ at said rear axle being obtained from a linear relationship of a form $$\delta_{hsoll} = \frac{S_{hsoll}}{C_h},$$

and wherein $C_h$ being an estimated rear wheel slip stiffness.

5. The method of claim 1, wherein said desired value $S_{vsoll}$ of a lateral force to be built up at said front axle being determined in a control process by a relationship of a form $$S_{vsoll} = \frac{l_h \cdot m \cdot a_y}{L} + \frac{J_z}{L} \cdot [\dot{\Psi}_{soll} - k_s \cdot (\Psi - \Psi_{soll})],$$

wherein $J_z$ being a moment of inertia, $\dot{\Psi}_{soll}$ being a desired yaw velocity, and $k_3$ being a third controller gain.

6. The method of claim 5, wherein said desired value $\alpha_{vsoll}$ of said slip angle $\alpha_v$ at said front axle being obtained from a linear relationship of a form $$\delta_{vsoll} = \frac{S_{vsoll}}{C_v},$$

and wherein $C_v$ being an estimated front wheel slip stiffness.

7. The method of claim 5, wherein said desired value $\alpha_{hsoll}$ of said slip angle $\alpha_h$ at said rear axle being obtained from a linear relationship of a form $$\delta_{hsoll} = \frac{S_{hsoll}}{C_h},$$

and wherein $C_h$ being an estimated rear wheel slip stiffness.

8. The method of claim 1, wherein said desired value $\alpha_{vsoll}$ of said slip angle $\alpha_v$ at said front axle being obtained from a linear relationship of a form $$\delta_{vsoll} = \frac{S_{vsoll}}{C_v},$$

and wherein $C_v$ being an estimated front wheel slip stiffness.

9. The method of claim 1, wherein said desired value $\alpha_{hsoll}$ of said slip angle $\alpha_h$ at said rear axle being obtained from a linear relationship of a form $$\delta_{hsoll} = \frac{S_{hsoll}}{C_h},$$

and wherein $C_h$ being an estimated rear wheel slip stiffness.

10. The method of claim 1, wherein said desired value $S_{vsoll}$ of said lateral force to be built up at said front axle being determined in a control process by a relationship of a form $$S_{vsoll} = \frac{l_h \cdot m \cdot v_x}{L} \cdot [\dot{\Psi} - \dot{\beta}_{vsoll} + k_2 \cdot (\beta_v - \beta_{vsoll})],$$

wherein $l_h$ being a distance from a center of gravity of said vehicle to said rear axle, $\beta_{vsoll}$ being a desired slideslip angle of said vehicle in a region of said front axle, $\beta_v$ being a slideslip angle of said vehicle in said region of said front axle, and $k_2$ being a second controller gain;

wherein said front steer-angle actuator is individually assigned to said first axle and said rear steer-angle actuator is individually assigned to said second axle;

wherein said control loop assigned to said front axle and said control loop assigned to said rear axle are decoupled from one another;

wherein said desired front axle value signal and said desired rear axle value signal are generated by a reference model, said reference model being implemented by an electronic computer from a processing of at least one output signal, representing a driver's wish, from a steering element position sensor, and of a sensor output signal characteristic of an operating state of said vehicle.

11. An apparatus for controlling yaw dynamics and lateral dynamics in a road vehicle having a first axle and a second axle comprising:

a first steering device for said front axle;
a second steering device for said rear axle;
a first steer angle actuator for said front axle;
a second steer angle actuator for said rear axle; and
at least one lateral acceleration sensor;
wherein a first control mode for a desired value $S_{vsoll}$ of a lateral force at said front axle being obtained from a relationship of a form $$S_{vsoll} = \frac{l_h \cdot m \cdot v_x}{L} \cdot [\dot{\Psi} - \dot{\beta}_{vsoll} + k_2 \cdot (\beta_v - \beta_{vsoll})],$$

and a second control mode for said desired value $S_{vsoll}$ being obtained from a relationship of a form $$S_{vsoll} = \frac{l_h \cdot m \cdot a_y}{L} + \frac{J_z}{L} \cdot [\dot{\Psi}_{soll} - k_3 \cdot (\dot{\Psi} - \dot{\Psi}_{vsoll})],$$

wherein m being a mass of said vehicle, L being a wheelbase of said vehicle, $l_h$ being a distance from a center of gravity of said vehicle to said rear axle, $\beta$ being a sideslip angle, $a_y$ being a lateral acceleration, $J_z$ being a moment of inertia, and $V_x$ being a longitudinal speed of said road vehicle, $\dot{\Psi}$ being a yaw velocity, $\dot{\Psi}_{soll}$ being a desired yaw velocity, $k_2$ being a second controller gain, and $k_3$ being a third controller gain.

12. An apparatus for controlling yaw dynamics and lateral dynamics in a road vehicle having a first axle and a second axle comprising:

a first steering device for said front axle;
a second steering device for said rear axle;
a first steer angle actuator for said front axle;
a second steer angle actuator for said rear axle; and
at least one lateral acceleration sensor;
wherein a first control mode for a desired value $S_{vsoll}$ of a lateral force at said front axle being obtained from a relationship of a form $$S_{vsoll} = \frac{l_h \cdot m \cdot v_x}{L} \cdot [\dot{\Psi} - \dot{\beta}_{vsoll} + k_2 \cdot (\beta_v - \beta_{vsoll})],$$

and a second control mode for said desired value $S_{vsoll}$ being obtained from a relationship of a form $$S_{vsoll} = \frac{l_h \cdot m \cdot a_y}{L} + \frac{J_z}{L} \cdot [\dot{\Psi}_{soll} - k_3 \cdot (\dot{\Psi} - \dot{\Psi}_{vsoll})],$$

wherein m being a mass of said vehicle, L being a wheelbase of said vehicle, $l_h$ being a distance from a center of gravity of said vehicle to said rear axle, $\beta$ being a sideslip angle, $a_y$ being a lateral acceleration, $J_z$ being a moment of inertia, and $V_x$ being a longitudinal speed of said road vehicle, $\dot{\Psi}$ being a yaw velocity, $\dot{\Psi}_{soll}$ being a desired yaw velocity, $k_2$ being a second controller gain, and $k_3$ being a third controller gain;

wherein said first control mode and second control mode being alternatively selectable.

13. The apparatus of claim 12 wherein said first control mode and said second control mode are in a first control loop;

wherein a desired value $S_{hsoll}$ for a lateral force $S_h$ to be built up at said rear axle being obtained from a relationship of a form $$S_{hsoll} = \frac{l_v \cdot m \cdot v_x}{L} \cdot [\dot{\Psi} - \dot{\beta}_{hsoll} + k_1 \cdot (\beta_h - \beta_{hsoll})]$$

in a second control loop assigned to said rear axle, wherein $\beta_{hsoll}$ being a desired slideslip angle of said vehicle in a region of said rear axle, and $\beta_h$ being a slideslip angle of said vehicle in said region of said rear axle, and $k_1$ being a first controller gain; and wherein for said desired value $S_{hsoll}$ a value of a rear axle steering angle $\delta_{hsoll}$ being determined by a relationship of a form $$\delta_{hsoll} = -\beta - \frac{l_h \cdot \dot{\Psi}}{v_x} + \alpha_{hsoll};$$

wherein said first steer-angle actuator is individually assigned to said front axle and said second steer-angle actuator is individually assigned to said rear axle;

wherein said first control loop assigned to said front axle and said second control loop assigned to said rear axle are decoupled from one another;

wherein a desired front axle value signal and a desired rear axle value signal are generated by a reference model, said reference model being implemented by an electronic computer from a processing of at least one output signal, representing a driver's wish, from a steering element position sensor, and of a sensor output signal characteristic of an operating state of said vehicle.

14. An apparatus for controlling yaw dynamics and lateral dynamics in a road vehicle having a first axle and a second axle comprising:

a first steering device for said front axle;
a second steering device for said rear axle;
a first steer angle actuator for said front axle;
a second steer angle actuator for said rear axle;
at least one lateral acceleration sensor;
a reference model, wherein said reference model generating desired values for a front axle steer angle $\delta_v$ and a rear axle steer angle $\delta_h$; and
wherein an automatic switchover being performed from a control mode in which a desired value $S_{vsoll}$ of a lateral force at said front axle being determined as a function of a system deviation $(\beta_v - \beta_{vsoll})$ of a sideslip angle in a region of said front axle, into a control mode in which a desired value $S_{vsoll}$ of a lateral force at said front axle being determined as a function of a system deviation ($\dot{\Psi} - \dot{\Psi}_{soll}$) of a yaw velocity when an ability of a tire to transmit lateral force being exhausted, or virtually exhausted, in an extreme range, or a rear axle steer angle actuator has failed.

15. An apparatus for controlling yaw dynamics and lateral dynamics in a road vehicle having a first axle and a second axle comprising:

a first steering device for said front axle;
a second steering device for said rear axle;
a first steer angle actuator for said front axle;
a second steer angle actuator for said rear axle; and
at least one lateral acceleration sensor;
wherein a disturbance estimator is provided for at least one of a plurality control loops provided for setting a front axle steer angle $\delta_v$ and a rear axle steer angle $\delta_h$; and
wherein a controller and a disturbance estimator which are assigned to the same controlled variable are designed using the same design model.

16. A method for controlling yaw dynamics and lateral dynamics in a road vehicle having a first axle and a second axle comprising:

determining a desired steer angle;
calculating a desired front axle value signal for input to a first controller;
calculating a desired rear axle value signal for input to a second controller;
generating a first drive signal via said first controller for driving an electrically drivable front steer-angle actuator;
generating a second drive signal via said second controller for driving an electrically drivable rear steer-angle actuator;
determining a desired value $S_{vsoll}$ for a lateral force $S_v$ to be built up at said front axle in a control process in a control loop assigned to said front axle;

determining a desired value of a slip angle at said front axle $\alpha_{vsoll}$ from an $S_v(\alpha_v)$ characteristic representing a dependence of said lateral force $S_v$ on a slip angle $\alpha_v$ at said front axle;
determining for said desired value $S_{vsoll}$ a desired value $\delta_{vsoll}$ of a front axle steering angle by a relationship of a form $$\delta_{vsoll} = -\beta + \frac{l_v \cdot \dot{\Psi}}{v_x} + \alpha_{vsoll},$$

wherein $l_v$ being a distance from a center of gravity of said vehicle to said front axle, $\beta$ being a sideslip angle, $\dot{\Psi}$ being a yaw velocity, and $V_x$ being a longitudinal speed of said road vehicle;
determining a desired value $S_{hsoll}$ for a lateral force $S_h$ to be built up at said rear axle in a control process by a relationship of a form $$S_{hsoll} = \frac{l_v \cdot m \cdot v_x}{L} \cdot [\dot{\Psi} - \dot{\beta}_{hsoll} + k_1 \cdot (\beta_h - \beta - _{hsoll})]$$

in a control loop assigned to said rear axle, wherein m being a mass of said vehicle, L being a wheelbase of said vehicle, $\beta_{hsoll}$ being a desired slideslip angle of said vehicle in a region of said rear axle, and $\beta_h$ being a slideslip angle of said vehicle in said region of said rear axle, and $k_1$ being a first controller gain;
determining a desired value of a slip angle at said rear axle $\alpha_{hsoll}$ from an $S_h(\alpha_h)$ characteristic representing a dependence of said lateral force $S_h$ on a slip angle $\alpha_h$ at said rear axle; and
determining for said desired value $S_{hsoll}$ a value of a rear axle steering angle $\delta_{hsoll}$ by a relationship of a form $$\delta_{hsoll} = -\beta - \frac{l_h \cdot \dot{\Psi}}{v_x} + \alpha_{hsoll};$$

wherein said front steer-angle actuator is individually assigned to said front axle and said rear steer-angle actuator is individually assigned to said rear axle;
wherein said control loop assigned to said front axle and said control loop assigned to said rear axle are decoupled from one another;
wherein said desired front axle value signal and said desired rear axle value signal are generated by a reference model, said reference model being implemented by an electronic computer from a processing of at least one output signal, representing a driver's wish, from a steering element position sensor, and of a sensor output signal characteristic of an operating state of said vehicle.

17. An apparatus for controlling yaw dynamics and lateral dynamics in a road vehicle having a first axle and a second axle comprising:

a first steering device for said front axle;
a second steering device for said rear axle;
a first steer angle actuator for said front axle;
a second steer angle actuator for said rear axle; and
at least one lateral acceleration sensor;
wherein a desired value $S_{vsoll}$ for a lateral force $S_v$ to be built up at said front axle being determined in a control process in a first control loop assigned to said front axle;

wherein a desired value of a slip angle at said front axle $a_{vsoll}$ being determined from an $S_v(\alpha_v)$ characteristic representing a dependence of said lateral force $S_v$ on a slip angle $\alpha_v$ at said front axle;

wherein for said desired value $S_{vsoll}$ a desired value $\delta_{vsoll}$ of a front axle steering angle being determined by a relationship of a form $$\delta_{vsoll} = -\beta + \frac{l_v \cdot \dot\Psi}{v_x} + \alpha_{vsoll},$$

wherein $l_v$ being a distance from a center of gravity of said vehicle to said front axle, $\beta$ being a sideslip angle, $\dot\Psi$ being a yaw velocity, and $V_x$ being a longitudinal speed of said road vehicle;

wherein a desired value $S_{hsoll}$ for a lateral force $S_h$ to be built up at said rear axle being obtained from a relationship of a form $$S_{hsoll} = \frac{l_v \cdot m \cdot v_x}{L} \cdot \left[\dot\Psi - \beta_{hsoll} + k_1 \cdot (\beta_h - \beta_{-hsoll})\right]$$

in a second control loop assigned to said rear axle, wherein $\beta_{hsoll}$ being a desired slideslip angle of said vehicle in a region of said rear axle, and $\beta_h$ being a slideslip angle of said vehicle in said region of said rear axle, and $k_1$ being a first controller gain;

wherein a desired value of a slip angle at said rear axle $\alpha_{hsoll}$ being determined from an $S_h(\alpha_h)$ characteristic representing a dependence of said lateral force $S_h$ on a slip angle $\alpha_h$ at said rear axle;

wherein for said desired value $S_{hsoll}$ a value of a rear axle steering angle $\delta_{hsoll}$ being determined by a relationship of a form $$\delta_{hsoll} = -\beta - \frac{l_h \cdot \dot\Psi}{v_x} + \alpha_{hsoll};$$

wherein said first steer-angle actuator is individually assigned to said front axle and said second steer-angle actuator is individually assigned to said rear axle;

wherein said first control loop assigned to said front axle and said second control loop assigned to said rear axle are decoupled from one another;

wherein a desired front axle value signal and a desired rear axle value signal are generated by a reference model, said reference model being implemented by an electronic computer from a processing of at least one output signal, representing a driver's wish, from a steering element position sensor, and of a sensor output signal characteristic of an operating state of said vehicle.

* * * * *